(12) United States Patent
Van De Ven et al.

(10) Patent No.: US 7,552,457 B2
(45) Date of Patent: Jun. 23, 2009

(54) METHOD OF CONTROLLING DESCRAMBLING OF A PLURALITY OF PROGRAM TRANSPORT STREAMS, RECEIVER SYSTEM AND PORTABLE SECURE DEVICE

(75) Inventors: Antonius Johannes Petrus Maria Van De Ven, Schiedam (NL); Andrew Augustine Wajs, Haarlem (NL)

(73) Assignee: Irdeto Access B.V. (NL)

( * ) Notice: Subject to any disclaimer, the term of this patent is extended or adjusted under 35 U.S.C. 154(b) by 960 days.

(21) Appl. No.: 10/778,801

(22) Filed: Feb. 12, 2004

(65) Prior Publication Data

US 2004/0215691 A1    Oct. 28, 2004

(30) Foreign Application Priority Data

Feb. 12, 2003    (EP)    ................................. 03100297

(51) Int. Cl.
*H04N 7/167*    (2006.01)
(52) U.S. Cl. ......................................... 725/31; 380/210
(58) Field of Classification Search ................... 725/31; 380/239
See application file for complete search history.

(56) References Cited

U.S. PATENT DOCUMENTS

| | | | |
|---|---|---|---|
| 5,138,659 | A | 8/1992 | Kelkar et al. |
| 6,647,061 | B1 | 11/2003 | Panusopone et al. |
| 7,039,614 | B1 | 5/2006 | Candelore |
| 7,072,865 | B2 * | 7/2006 | Akiyama ..................... 705/51 |
| 7,092,729 | B1 * | 8/2006 | Fichet et al. ................ 455/466 |
| 7,120,253 | B2 | 10/2006 | Ducharme et al. |
| 7,124,303 | B2 | 10/2006 | Candelore et al. |
| 7,376,829 | B2 | 5/2008 | Ranjan |
| 2001/0046299 | A1 * | 11/2001 | Wasilewski et al. ......... 380/282 |
| 2002/0073419 | A1 * | 6/2002 | Yen et al. ....................... 725/23 |
| 2002/0076050 | A1 * | 6/2002 | Chen et al. ................... 380/231 |
| 2002/0094084 | A1 | 7/2002 | Wasilewski et al. |
| 2002/0101991 | A1 | 8/2002 | Bacon et al. |
| 2002/0150248 | A1 | 10/2002 | Kovacevic |
| 2004/0114764 | A1 * | 6/2004 | Dauvois et al. ............. 380/277 |

OTHER PUBLICATIONS

"U.S. Appl. No. 10/729,247, Notice of Allowance mailed Oct. 1, 2007", 11 pgs.
"U.S. Appl. No. 10/729,247, Response filed Jul. 24, 2007 to Non-Final Office Action mailed Apr. 24, 2007", 17.
"U.S. Appl. No. 10/729,247, Notice of Allowance mailed Feb. 4, 2008", NOAR,11 pgs.

* cited by examiner

*Primary Examiner*—Andrew Y Koenig
*Assistant Examiner*—Mark D Featherstone
(74) *Attorney, Agent, or Firm*—Schwegman, Lundberg & Woessner, P.A.

(57) ABSTRACT

A method of controlling descrambling of a plurality of program transport streams received by a receiver system comprises receiving a sequence of messages in a conditional access sub-system (9,10) comprised in said receiver system, each message being associated with one of a number of scrambled program transport streams and representing a request for returning information enabling the associated scrambled transport stream to be descrambled by at least one descrambler module (12) in the receiver system, determining whether messages received within a certain interval are associated with a number of different scrambled program transport streams, and denying at least one of the requests represented by the messages received in the certain interval, if the number of different scrambled program transport streams with which the messages are associated exceeds a pre-determined number.

13 Claims, 2 Drawing Sheets

METHOD OF CONTROLLING DESCRAMBLING OF A PLURALITY OF PROGRAM TRANSPORT STREAMS, RECEIVER SYSTEM AND PORTABLE SECURE DEVICE

The present patent application claims the priority benefit of the filing date of European Application (EPO) No. 03100297.5 filed Feb. 12, 2003, which is incorporated herein by reference.

FIELD OF THE INVENTION

The invention relates to a method of controlling descrambling of a plurality of program transport streams received by a receiver system.

One aspect of the invention further relates to a receiver system, comprising a receiver that comprises at least one tuner for receiving a signal carrying a digital transport stream and at least one demodulator for retrieving a plurality of program transport streams from the received digital transport stream(s), which receiver system further comprises a conditional access sub-system capable of carrying out such a method.

One aspect of the invention relates to a portable secure device, comprising a conditional access sub-system for use in such a receiver system, and to a computer program for execution in such a receiver system.

BACKGROUND OF THE INVENTION

Examples of a method, receiver system, portable secure device and computer program are known e.g. from 'Functional Model of a conditional access system', EBU Technical Review 266, Winter 1995, p. 64-77. This publication discloses a functional model of a conditional access reference system. A common interface is used between an Integrated Receiver Decoder and a CA system. The CA system is contained in a low-priced proprietary module which communicates with the IRD via a common interface. The IRD receives a scrambled MPEG-2 Transport Stream. Entitlement Control Messages (ECMs) are used to recover the descrambling control word in the decoder. Data filters filter out the ECMs, which are sent to a security processor in the CA system, which recovers the descrambling control word and returns it to a descrambler. Entitlement Management Messages authorise a viewer to descramble a service. At least the security processor is usually implemented as a smart card.

A problem of the known system is that the security processor returns control words in response to each ECM for which an appropriate EMM has been sent. This opens up the opportunity of hook piracy. Hook piracy involves providing ECMs associated with several different program transport streams to one conditional access sub-system, e.g. a smart card, and intercepting the returned control words, which are then distributed to other receivers than the one used by the authorised subscriber. Thus, one subscription is 'shared' by many users.

SUMMARY OF THE INVENTION

The invention provides a method, receiver system, portable secure device and computer program of the types mentioned above, which enable the provider of the program streams to assert control over the number of program transport streams that are concurrently accessed by a user of the receiver system.

According to one aspect, the invention seeks to achieve this by providing a method of controlling descrambling of a plurality of program transport streams received by a receiver system, which method comprises receiving a sequence of messages in a conditional access sub-system comprised in said receiver system, each message being associated with one of a number of scrambled program transport streams and representing a request for returning information enabling the associated scrambled transport stream to be descrambled by at least one descrambler module in the receiver system, determining whether messages received within a certain interval are associated with a number of different scrambled program transport streams, and denying at least one of the requests represented by the messages received in the certain interval, if the number of different scrambled program transport streams with which the messages are associated exceeds a pre-determined number.

As used in the context of the present application, the term program transport stream denotes a unicast, multicast or broadcast transport bit stream that has been generated for a program. The term program refers to a multiplex of one or more elementary bit streams (e.g. audio, video, data), sharing a common time base. A program corresponds to a channel in an analogue broadcast environment, but may be intended for one specific recipient. The term sequence of received messages refers to a set of two or more messages, ordered in accordance with the time at which they are received.

By means of the method according to the invention, the conditional access sub-system is provided with the functionality to detect when it is being asked to enable descrambling of several different program transport streams concurrently. By programming it to then limit the amount of information it returns in response to the received messages, concurrent descrambling of more than an authorised number of program transport streams is prevented. The method can be advantageously employed to detect hook piracy, but also to implement a payment scheme whereby the subscription fees depend on the number of program transport streams that a subscriber is allowed to access concurrently.

In an optional embodiment of the invention, it is determined whether messages received within a certain interval are associated with a number of different scrambled program transport streams by analysing characteristics of the sequence of received messages.

By analysing the sequence of messages received by it, rather than just the contents of the messages, the conditional access sub-system can not only enable only the descrambling of those program transport streams to which the user of the receiver system is allowed access, but it can check whether it is being asked to enable the descrambling of one or several of the allowed program transport streams.

An embodiment of the method according to the invention comprises determining the value of a time interval between two received messages.

If information enabling several program transport streams to be descrambled is requested, more messages are sent to the conditional access sub-system and the value of the time interval decreases. Thus, this embodiment has the advantage of simplicity, in that no further information need be included with the messages. An increase in the rate at which they arrive suffices to alert the conditional access sub-system to attempts to access several program transport streams concurrently.

In a further refined embodiment, each message comprises information representative of a time interval between two messages associated with the same scrambled program transport stream, and the method comprises comparing the information with the determined value of the time interval.

Thus, the method can also be used when the frequency with which messages are sent differs per program transport stream, or is altered for one of the program transport streams.

An optional embodiment of the method according to the invention comprises receiving channel identifiers with each message, a channel identifier value identifying the scrambled program transport stream with which the message is associated, wherein the conditional access sub-system limits the number of program transport streams that can be descrambled by returning information enabling only program transport streams in a set of limited size to be descrambled.

Thus, it is possible to entitle the user of the receiver system to access a limited number of program transport streams simultaneously, for example enabling one program to be viewed, whilst another is being recorded, but preventing a third program being passed on to an unauthorised recipient. By using a set of program transport streams which may be descrambled in combination with the channel identifiers, it can be assured that all requests for information pertaining to the program transport streams which may be descrambled are honoured.

In an advantageous variant of this embodiment, the conditional access sub-system determines the size of the set from information comprised in an entitlement message received by the receiver system.

Thus, it is possible for a broadcast system operator to dynamically add or take away entitlements for a particular subscriber. In particular, it is possible to levy an extra charge for each additional program transport stream that is concurrently descrambled.

In an optional embodiment of the method according to the invention, each message comprises a time stamp, representing a time value, the method comprising comparing the time value in a received message with a previously stored time value, wherein the conditional access sub-system only limits the number of program transport streams that can be descrambled if the difference in time values exceeds a certain free switching time interval value.

This allows the operator of the receiver system a certain interval in which to change channels. This feature is especially useful if the number of program transport streams that may be descrambled concurrently is limited to one, the more so if the conditional access sub-system completely denies all access when an attempt is detected to access more than one program transport stream concurrently.

According to another aspect, the invention provides a receiver system, comprising a receiver that comprises at least one tuner for receiving a signal carrying a digital transport stream and at least one demodulator for retrieving a plurality of program transport streams from the received digital transport stream(s), which receiver system further comprises a conditional access sub-system capable of carrying out a method according to the invention.

The receiver system may comprise a single integrated receiver/decoder, e.g. a set-top box, programmed to execute the method according to the invention. Alternatively, it may comprise a combination of a receiver/decoder unit with a smart card, with a conditional access module, or with a conditional access module and a smart card. The method may be executed by either the smart card or the conditional access module or by both of them in co-operation, depending on the particular configuration.

An especially useful embodiment of the receiver system is one in which the receiver comprises at least one further tuner and is arranged to simultaneously retrieve a number of program transport streams from digital transport streams carried by signals with different frequencies.

In this embodiment, the operator of the receiver system can truly descramble two program transport streams concurrently and totally independently of one another, provided the conditional access sub-system enables the concurrent descrambling, since one is not limited to two program transport streams in the same digital transport stream.

According to a further aspect of the invention, there is provided a portable secure device, comprising a conditional access sub-system for use in a receiver system according to the invention, wherein the conditional access sub-system is capable of carrying out a method according to the invention.

The term portable secure device refers to a self-contained device with special features to render the device physically tamper-proof and/or protective features implemented in software that make it difficult or impossible to extract information stored in the device. It may be a smart card or any other chip-based card device, or object of similar function and performance, possessing, for example, microprocessor and memory storage. Included are devices with a different shape than a card, such as a transponder key. Included are also devices equipped with a PCMCIA interface. The portable secure device, e.g. a smart card or conditional access module, can be distributed by an operator of a subscriber authorisation system. Especially where the portable secure device is used in conjunction with a generic receiver with more than one tuner, the operator of the subscriber authorisation system can still exercise control over the number of program transport streams that are descrambled concurrently.

According to a last aspect of the invention, there is provided a computer program for execution in a receiver system according to the invention which, when executed in the receiver system allows the conditional access sub-system to carry out a method according to the invention.

BRIEF DESCRIPTION OF THE DRAWINGS

The invention will now be explained in further detail with reference to the accompanying drawings, of which

SPECIFIC DESCRIPTION

Figure 1:
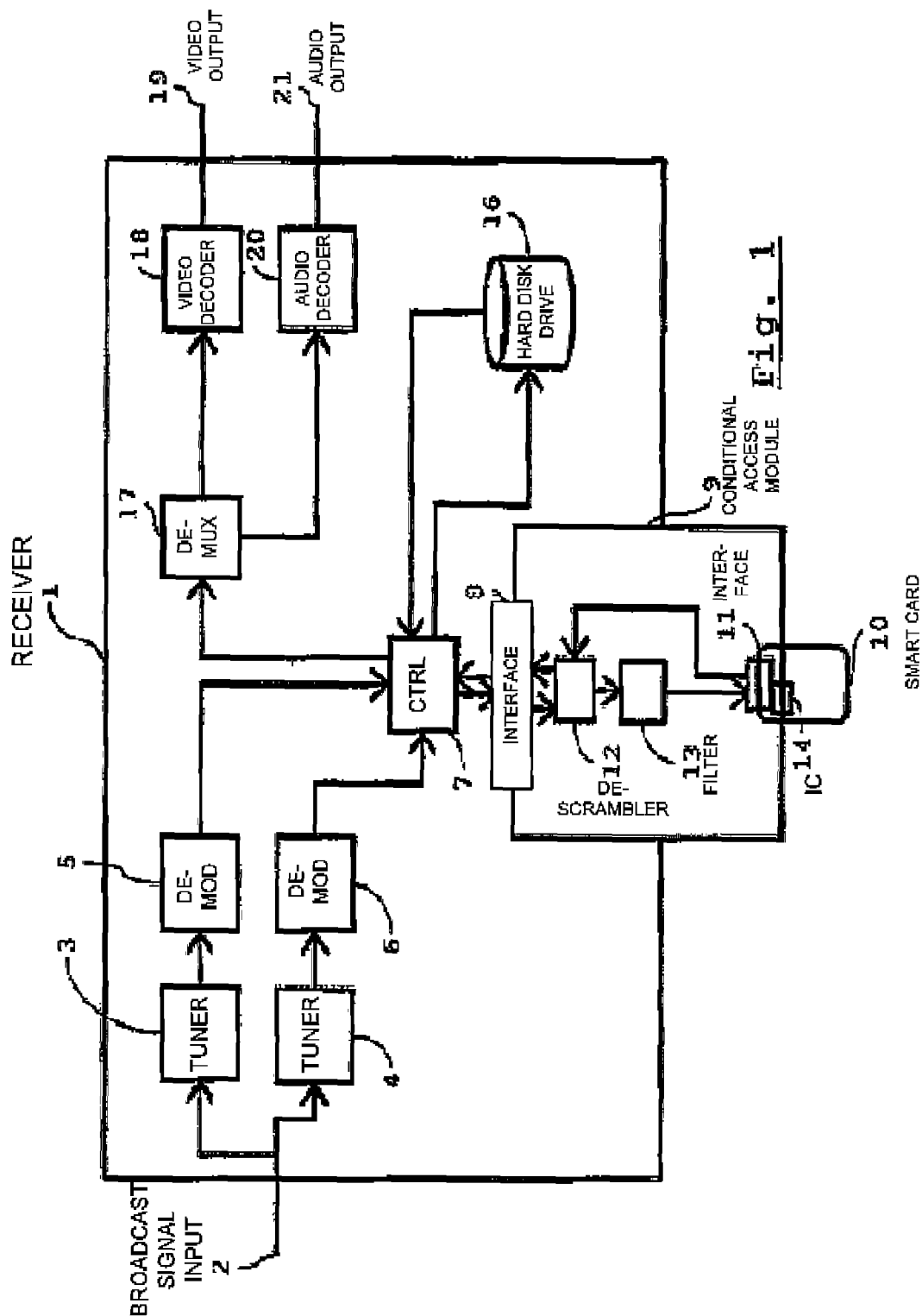
FIG. 1 shows a schematic diagram of an embodiment of the receiver system according to the invention.

A receiver system comprises a receiver 1. The receiver 1 is in the form of a set-top box, but the invention can also be implemented in receiver systems comprising a digital television set with integrated conditional access functionality, in a receiver system comprising a peripheral TV receiver for a personal computer, or in a receiver system comprising a personal computer with a TV receiver plug-in card installed. Although the diagram of FIG. 1 presents the receiver system as being composed of a number of components, these need not necessarily be implemented as discrete components. Several of the components may be integrated in one chip, as is well-known in the art.

The receiver receives a broadcast signal via a broadcast signal input 2. The broadcast signal can be received via terrestrial, satellite or cable broadcast, for example according to one of the Digital Video Broadcast (DVB) standards (e.g. European Broadcasting Union standards EN 300 421, 300 429, 300 744, 300 748, 300 749). The broadcast signal covers a certain frequency range, within which carrier signals of different frequencies can be discerned. Each carrier signal carries an MPEG-2 transport stream. The MPEG transport stream comprises a multiplex of a number of program transport streams, which together form a so-called bouquet. Each program transport stream comprises a multiplex of program elementary streams (e.g. audio, video, data), sharing a common time base. The program transport stream, or the individual program elementary streams making up a program transport stream, has been scrambled using a key, which changes every 10 seconds or so. A stream of Entitlement Control Messages is transmitted within each program transport stream. The Entitlement Control Messages contain the encrypted keys used to scramble the associated program transport stream, and have been separately scrambled.

The receiver 1 comprises a first tuner 3 and a second tuner 4. Thus, the receiver is able to tune in to two different carrier signals within the broadcast signal simultaneously. This has the advantage that it is possible to receive and decode program transport streams from different bouquets at the same time.

A first demodulator 5 retrieves a first program transport stream comprising an associated stream of Conditional Access (CA) messages from the carrier signal to which the first tuner 3 is tuned. A second demodulator 6 retrieves a second program transport stream with an associated stream of CA messages from the carrier signal to which the second tuner 4 is tuned. A receiver controller 7 directs the retrieved bit streams to other components in the receiver system.

In the shown embodiment, the receiver system comprises an interface 8 between the receiver and a conditional access sub-system. The conditional access sub-system comprises a conditional access module 9, inserted into a slot in the receiver 1, and a smart card 10, inserted into the conditional access module 9. The receiver system comprises an interface for communicating with the conditional access sub-system. In this example, the receiver system comprises an interface 8, for example a PCMCIA interface, between the receiver 1 and the conditional access module 9. The receiver system further comprises an interface 11 between the conditional access module and the smart card 10. In the example to be described here, the smart card 10 is arranged to carry out the method of the invention.

Configurations other than the one shown in FIG. 1 are also possible within the scope of the invention. For example, the conditional access sub-system could be implemented as software within the receiver 1, there being no detachable secure module, such as the conditional access module 9 or the smart card 10. In this case, the method according to the invention is executed within the receiver. In another embodiment, the smart card 10 executes the method according to the invention, but is directly inserted into a smart card reader comprised in the receiver 1. In yet another embodiment, the conditional access sub-system comprises only the conditional access module 9, which executes the method according to the invention, there being no smart card 10. Another embodiment is conceivable in which the conditional access module 9 and the smart card 10 execute the method according to the invention in tandem, as will also be explained below.

In the example of FIG. 1, a stream of data comprising at least one of the two retrieved program transport streams and ECMs for two different program transport streams is passed through the interface 8 between the receiver 1 and the conditional access module 9. The conditional access module 9 comprises a descrambler 12, which can descramble the program transport streams using appropriate control words and the ECMs using a key, both of which it must receive from the smart card 10. A filter module 13 within the conditional access module filters the CA messages from the received stream of data, and forms them into an ordered sequence of messages, which are supplied to the smart card 10. Thus, the conditional access sub-system comprises a module for receiving a sequence of messages, each message being associated with one of a plurality of different program transport streams. Each of these messages represents a request to return information enabling the associated program transport stream to be descrambled by the descrambler 12 in the receiver system. The information may be either a control word enabling the program elementary streams to be descrambled, or a key enabling one or more of the Entitlement Control Messages to be descrambled. In all cases, the smart card 10 will check a set of entitlement parameters, permanently stored in the smart card 10 or transmitted to it in Entitlement Management Messages (EMMs) to determine whether the message is associated with a program transport stream to which the user of the receiver system is entitled. However, instead of honouring all requests for control words enabling program transport streams to which the user is entitled, the invention allows the broadcaster to control the number of program transport streams that are concurrently descrambled, even though the subscriber is in principle entitled to access each of them per se. To this end, characteristics of the sequence of messages sent to the smart card 10 are analysed.

In the embodiment described here, the smart card 10 comprises an integrated circuit 14 comprising a processor, random access memory and an EEPROM, in which computer program code, enabling the smart card 10 to execute the method according to the invention, is stored.

The smart card 10 comprises an analysis module, implemented for example in the computer program code, for determining whether the messages received by it are associated with a plurality of different scrambled program transport streams. The module can be implemented in a number of ways.

In a first embodiment of the invention, the analysis module determines the value of a time interval between consecutive messages. This analysis uses the fact that the control word used to scramble the program transport stream or ECMs is changed at regular intervals, for example every 10 seconds. If messages associated with more than one program transport stream are-sent, the rate at which messages are sent to the smart card 10 increases. To enable the value of the time interval to be determined, the receiver system comprises a real-time clock (not shown). The real time clock can be in the receiver 1 or conditional access module 9, in which case the smart card 10 must request the time. The real-time clock may also be comprised in the smart card 10 itself.

In an optional variant of the first embodiment, the messages sent to the smart card 10 comprise information representative of a time interval between two consecutive messages associated with the same scrambled transport stream. The analysis module is arranged to retrieve this information from the received messages, and to compare the time interval between consecutive messages as determined using the real-time clock with the retrieved information. This variant has the advantage of functioning in cases where ECMs associated with different program transport streams are sent at different rates. It is also allows a broadcaster to change the rate at which ECMs are sent, without necessitating an update within the analysis module.

In another variant of the first embodiment, the analysis module maintains a table comprising a plurality of previously determined time interval values between consecutive messages. The analysis module is arranged to compare the determined time interval between two received messages with at least one value derived from the previously determined time intervals stored in the table. Thus, the analysis module analyses the contents of the table, for example to determine the average rate at which messages arrive, or to detect patterns, for example an irregular sequence of time intervals between consecutive received messages. Consider a case in which ECMs for a first program transport stream are sent every 10 seconds and those for a second program transport stream are sent every 20 seconds. A possible sequence of time intervals between messages received within the conditional access sub-system might then be: 10 s -1 s -9 s -10 s -1 s -9 s- , etc. In this variant, the analysis module is provided with a set of rules, enabling it to detect patterns in the time intervals between messages that are indicative of a sequence of messages associated with a plurality of program transport streams.

In another embodiment of the invention, which may be combined with the ones described above, each message received by the smart card 10 comprises a channel identifier. A channel identifier identifies the scrambled program transport stream with which the message is associated. The analysis module analyses the characteristics of the sequence of received messages by means of their channel identifiers.

Figure 2:
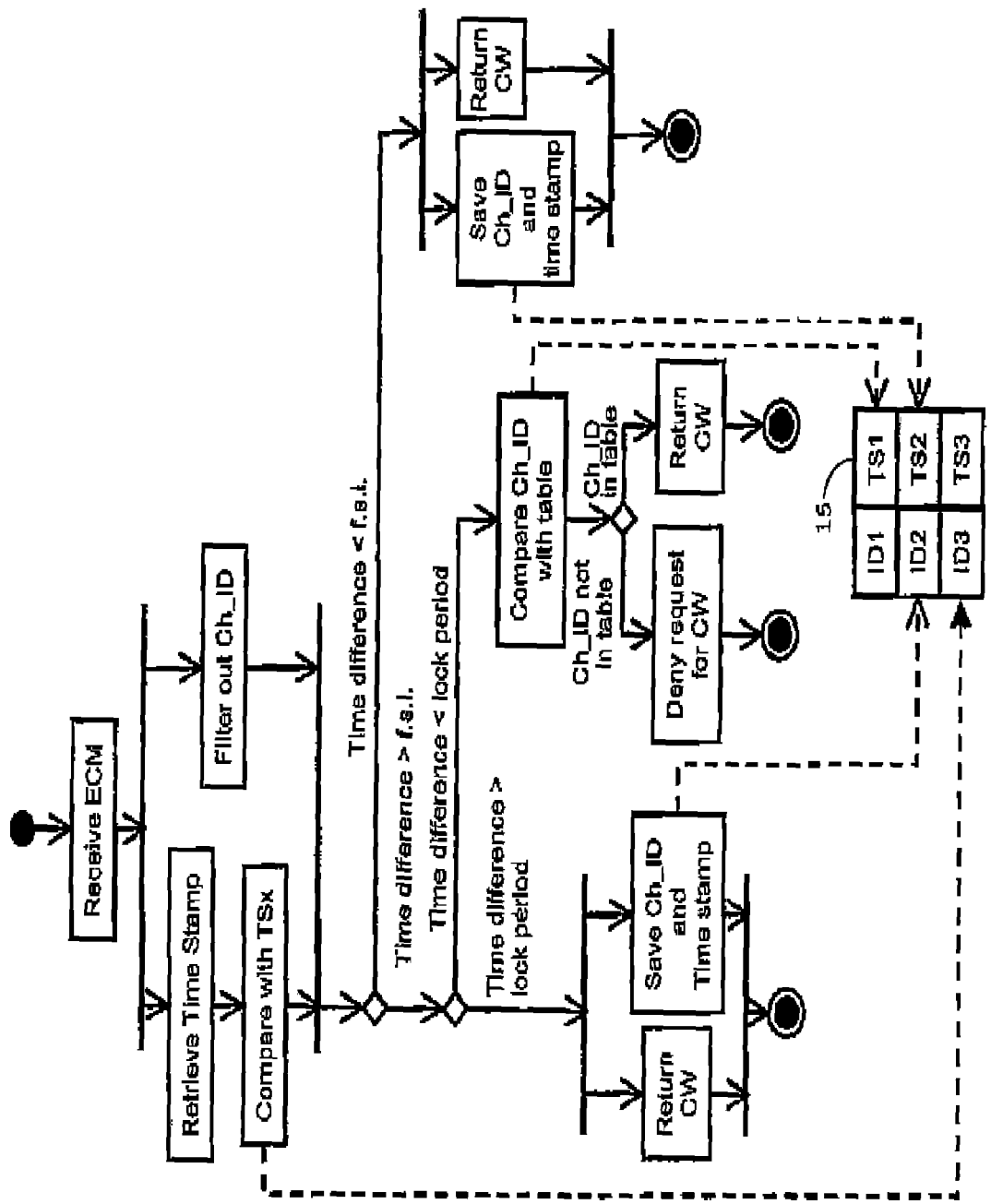
FIG. 2 shows a flow diagram of an embodiment of the method according to the invention.

In one embodiment, shown in FIG. 2, the channel identifier of each received message is compared with the previously received channel identifier. This embodiment will be described in more detail further below.

In another embodiment, the analysis module is arranged to populate a table with consecutively received channel identifier values and to search for at least one pre-determined type of pattern in the table. This embodiment has the advantage of being able to discern between a case in which the sequence of received channel identifiers varies due to the selection by the user of a different program transport stream for descrambling and one in which it varies due to attempts to descramble several program transport streams concurrently.

Suppose the program transport streams to have channel identifier values 1, 2, 3, 4, etc. The sequence of channel identifier values in the table will be 1-1-1-1-1-1-1. . ., if only requests for control words enabling one program transport stream to be scrambled are received by the smart card 18. If the viewer occasionally switches to another program transport stream, then returns to the previous one, the pattern would look more or less as follows: 1-1-1-2-2-2-1-1-. . . . If a viewer is zapping through all the channels, pausing a few seconds at each channel, the sequence will be: 1-1-2-2-3-3-4-4-. . . . An attempt to descramble program transport streams 1 and 2 concurrently might result in a sequence of channel identifier values: 1-2-1-2-1-2. . . . In this embodiment of the invention, this type of pattern corresponds to a pre-determined type of pattern which the analysis module is programmed to recognise.

Regardless of the type of analysis used to detect whether an attempt is made to descramble several different program transport streams concurrently, at least one of the requests for returning a control word will be denied by the smart card 18, if it detects such an attempt.

In one embodiment, the smart card can be programmed to deny all requests if it detects that an attempt is made to descramble more than the allowed number of program transport streams. This effectively shuts down the receiver system.

In another embodiment, channel identifiers are received with each message, a channel identifier value identifying the scrambled program transport stream with which the message is associated. The conditional access sub-system limits the number of program transport streams that can be concurrently descrambled by returning information, i.e. control words, enabling only program transport streams in a set of limited size to be descrambled. In this embodiment, a set comprising a limited number of channel identifier values is established.

The conditional access sub-system only honours requests represented by messages with a channel identifier that is in the set. All other requests are denied. This embodiment has the advantage that it can be used by a broadcaster to allow a pre-set number of program transport streams to which a subscriber is entitled to be descrambled fully. In other words, not only is descrambling of program transport streams of which the channel identifier is not in the set denied, but also the descrambling of the program transport streams of which the channel identifiers are in the set is fully enabled. Thus, the broadcaster can determine that a subscriber may descramble three program transport streams concurrently, but no more.

In an advantageous embodiment, the size of the set, i.e. the number of program transport streams that may be concurrently descrambled, is determined from information comprised in the smart card 10 or in an Entitlement Management Message received by the receiver system. Thus, the broadcaster can increase the number of allowed program transport streams in return for an extra fee.

As mentioned, FIG. 2 shows another embodiment of the invention, in which the channel identifiers are used to detect attempts to descramble several program transport streams concurrently. In this embodiment, each message received by the smart card 10 further comprises a time stamp, representing a time value. The time stamp may have been included in the ECM by the broadcaster, or the receiver 1 can have added a time stamp to the ECM upon reception. If the time stamp in a message received by the conditional access sub-system is derived from a time stamp contained in an entitlement message in the associated program transport stream received by the receiver system, this has the advantage that it is not possible to fool the smart card by providing it with a sequence of delayed messages.

In the embodiment of FIG. 2, the invention is used to allow the receiver system to concurrently descramble a number (three in this example) of program transport streams to which the subscriber is entitled. The analysis module in the conditional access sub-system maintains a table 15, comprising a number of entries, each entry comprising a channel identifier value and a time stamp value.

Upon receipt of a message, the time stamp and channel identifier values comprised in the message are retrieved. The analysis module compares the retrieved time stamps with each of the stored time values. If the smallest difference between the retrieved time stamp value and a stored time value is smaller than a certain free switching time interval value, the retrieved channel identifier value and time stamp value are saved in the table 15, replacing the values for the entry that was used to determine the smallest difference in time value.

If the difference between the retrieved time stamp value and each of the time values stored in the table 15 exceeds the value of the free switching time interval, but is smaller than a certain lock period value, then the analysis module compares the retrieved channel identifier value with each of the identifier values in the table 15. Only if the retrieved channel identifier value corresponds to one of the channel identifier values in the set of channel identifier values stored in the table 15, is the requested control word returned by the smart card 10. Otherwise, the request represented by the message from which the channel identifier value was taken is denied, i.e. the requested information is not returned. In this case, the receiver system is in the channel lock mode: only the channels identified in the table 15 may be descrambled.

The channel locks for each of the (three) entries in the table 15 last for a certain lock period. If the time difference between the retrieved time stamp value and one of the time values in the table exceeds the lock period value, the corresponding entry in the table 15 is replaced by the channel identifier value and time stamp value retrieved from the received message, and the control word requested by means of that message is returned by the smart card 10.

The embodiment illustrated in FIG. 2 has the advantage that the analysis of the sequence of message is quite simple. If the table 15 contains only one entry, then a received channel identifier value is only compared with the previously received channel identifier value. The effect of using a free switching time interval and lock period is to allow a switch in channels, which would otherwise be impossible if the received channel identifier value should always correspond to the previously received channel identifier value. As an example, a typical free switching time interval value might be two minutes, with the lock period value being 20 seconds.

The invention is particularly useful for receiver systems such as the one shown in FIG. 1. The receiver comprises a hard disk drive 16 for recording one of the received program transport streams and the associated ECMS. Whilst one of the program transport streams is being recorded, the contents of the other can be shown on a television set (not shown). To this end, the descrambler 12 descrambles the ECMS, EMMs and program transport stream to be shown, but also the ECMs of the program transport stream to be recorded. The latter is necessary, because information that is needed to play back the recorded stream at a later date must be extracted from the ECMs upon reception of the program transport stream. Thus, in this embodiment, it should be possible to descramble part or all of two scrambled program transport streams received by the receiver 1, but no more. At least the elementary streams (video, audio, data) of one of the scrambled program transport streams are recorded on hard disk drive 16 in scrambled form, together with scrambled control words enabling the recorded data to be descrambled upon playback. Additionally, the other program transport stream is descrambled by the descrambler 12, using the information received from the smart card 10. The descrambled program transport stream is de-multiplexed in a de-multiplexer 17, which sorts out the different program elementary streams (video, audio, data) comprised in the program transport stream. A video decoder 18 decompresses and decodes the video elementary stream, to provide a video signal on a video output 19. An audio decoder 20 decompresses and decodes the audio elementary stream, to provide an accompanying audio signal on an audio output 21.

It will be realised that the invention is not limited to the embodiments described above, which can be varied within the scope of the accompanying claims. In particular, each of the method which may be used by the analysis module to detect attempts to concurrently descramble a plurality of program transport streams may be combined with any of the described responses. Furthermore, embodiments are possible in which the conditional access module 9 processes the requests represented by Entitlement Control Messages and passes only the Entitlement Control Messages in response to which a control word should be provided to the smart card 10. In effect, the conditional access module 9 carries out the method according to the invention by selecting the requests that should be honoured, but the requested information is generated by the smart card 10.

The invention claimed is:

1. A method of controlling descrambling of a plurality of program transport streams received by a receiver system, which method comprises:
   receiving a sequence of messages in a conditional access sub-system comprised in said receiver system, each message being associated with one of a number of scrambled program transport streams and representing a request for returning information;
   enabling the associated scrambled transport stream to be descrambled by at least one descrambler module in the receiver system;
   determining whether messages received within a certain interval are associated with a number of different scrambled program transport streams;
   denying at least one of the requests represented by the messages received in the certain interval, if the number of different scrambled program transport streams with which the messages are associated exceeds a pre-determined number; and
   determining a value of a time interval between two received messages;
   wherein it is determined whether messages received within a certain interval are associated with a number of different scrambled program transport streams by analyzing characteristics of the sequence of received messages.

2. The method according to claim 1, wherein each message comprises information representative of a time interval between two messages associated with the same scrambled program transport stream, the method comprising comparing the information with the determined value of the time interval.

3. The method according to claim 1, comprising maintaining a table comprising a plurality of previously determined time interval values between consecutive messages and comparing the determined time interval with at least one value derived from the previously determined time intervals in the table.

4. The method according to claim 1, comprising receiving channel identifiers with each message, a channel identifier value identifying the scrambled program transport stream with which the message is associated, and analyzing the characteristics of the sequence of received messages by means of their channel identifiers.

5. The method according to claim 4, comprising populating a table with consecutively received channel identifier values and searching for at least one pre-determined type of pattern in the table.

6. The method according to claim 1, comprising receiving channel identifiers with each message, a channel identifier value identifying the scrambled program transport stream with which the message is associated, wherein the conditional access sub-system limits the number of program transport streams that can be descrambled by returning information enabling only program transport streams in a set of limited size to be descrambled,
   wherein each message comprises a time stamp, representing a time value, the method comprising comparing the time value in a received message with a previously stored time value, wherein the conditional access sub-system only limits the number of program transport streams that can be descrambled if the difference in time values exceeds a certain free switching time interval value.

7. The method according to claim 6, wherein the conditional access sub-system determines the size of the set from information comprised in an entitlement message received by the receiver system.

8. The method according to claim 6, wherein each of the messages received by the conditional access sub-system comprises encrypted control words, wherein the conditional access sub-system decrypts and returns at least the control words.

9. The method according to claim 6, wherein the previously stored time value is replaced by the time value in the received message if the difference in time values exceeds a certain lock period value.

10. A receiver system, comprising a receiver that comprises at least one tuner for receiving a signal carrying a digital transport stream and at least one demodulator for retrieving a plurality of program transport streams from the received digital transport stream(s), which receiver system further comprises a conditional access sub-system capable of carrying out a method according to claim 1.

11. The receiver system according to claim 10, wherein the receiver comprises at least one further tuner and is arranged to simultaneously retrieve a number of program transport streams from digital transport streams carried by signals with different frequencies.

12. A portable secure device, comprising a conditional access sub-system for use in a receiver system according to claim 10, wherein the conditional access sub-system is capable of carrying out a method according to claim 1.

13. A machine-readable medium comprising instructions, which when implemented by one or more processors, perform the following operations:

receiving a sequence of messages in a conditional access sub-system comprised in said receiver system, each message being associated with one of a number of scrambled program transport streams and representing a request for returning information;

enabling the associated scrambled transport stream to be descrambled by at least one descrambler module in the receiver system;

determining whether messages received within a certain interval are associated with a number of different scrambled program transport streams;

denying at least one of the requests represented by the messages received in the certain interval, if the number of different scrambled program transport streams with which the messages are associated exceeds a pre-determined number; and determining the value of a time interval between two received messages;

wherein it is determined whether messages received within a certain interval are associated with a number of different scrambled program transport streams by analyzing characteristics of the sequence of received messages.

* * * * *

UNITED STATES PATENT AND TRADEMARK OFFICE
CERTIFICATE OF CORRECTION

PATENT NO. : 7,552,457 B2
APPLICATION NO. : 10/778801
DATED : June 23, 2009
INVENTOR(S) : Andrew A. Wajs et al.

It is certified that error appears in the above-identified patent and that said Letters Patent is hereby corrected as shown below:

In column 9, line 20, delete "ECMS." and insert -- ECMs. --, therefor.

In column 9, line 23, delete "ECMS," and insert -- ECMs, --, therefor.

Signed and Sealed this

Ninth Day of March, 2010

David J. Kappos
*Director of the United States Patent and Trademark Office*